April 7, 1964 E. G. ANDREWS 3,128,452

MAGNETIC STORAGE CIRCUITS

Filed May 22, 1959 3 Sheets-Sheet 1

INVENTOR
E. G. ANDREWS
BY Walter M. Hill
ATTORNEY

INVENTOR
E. G. ANDREWS
BY Walter M. Hill
ATTORNEY

April 7, 1964 E. G. ANDREWS 3,128,452

MAGNETIC STORAGE CIRCUITS

Filed May 22, 1959 3 Sheets-Sheet 3

INVENTOR
E. G. ANDREWS
BY Walter M. Hill
ATTORNEY

United States Patent Office 3,128,452

Patented Apr. 7, 1964

3,128,452
MAGNETIC STORAGE CIRCUITS

Ernest G. Andrews, Mountain Lakes, N.J., assignor to Bell Telephone Laboratories, Incorporated, New York, N.Y., a corporation of New York Filed May 22, 1959, Ser. No. 815,229
20 Claims. (Cl. 340—174)

This invention relates to storage circuits and, in particular, to such circuits in which stored information may be delivered at output terminals while either retaining the information within the circuits or replacing it with new information.

As magnetic devices are well known and are easily adapted for storing information, they are utilized herein to describe and illustrate the present invention. Other storage devices may be utilized in practicing the invention as will become apparent from the following description.

In general, magnetic devices have substantially rectangular hysteresis characteristics and are capable of being switched from one magnetic condition or state to another by passing currents of the appropriate polarity and amplitude through coils associated with them. Information is stored by placing a magnetic device in one or the other of its two magnetic conditions, which is often used to represent respective digits of a binary numbering system. Stored information is read out of such a device by applying currents to one or more read-out windings associated with it and detecting whether or not its magnetic condition changes.

When the magnetic condition of a magnetic device is changed or switched during the read-out process, the information once read out is no longer stored in the device and consequently is not available for future use. Several approaches have been made to overcome this problem. One obvious scheme is to restore the read-out information in the same device at the end of the read-out operation. This scheme has at least two disadvantages in that the information must be stored in some external means until the completion of the read-out operation and additional time must be allowed for a restoring operation. Other schemes restore the read-out information in other magnetic devices. One of the last-mentioned schemes utilizes pairs of devices with the devices in each pair being used alternately for storing. Several arrangements utilizing devices in this manner are disclosed in applicant's co-pending application, Serial No. 766,040, filed on October 8, 1958, now U.S. Patent No. 3,050,716. These arrangements are of the so-called word-organized type as more than one bit of information is handled during a write-in or a read-out operation. In particular, this co-pending application discloses matrices in which pairs of magnetic devices are arranged in rows and columns. In operation, information is read out of the storing devices in a particular row and written into the remaining devices in the same row which are always in a standby or nonstoring condition. Either the information being read out or new information may be written into the nonstoring devices.

In addition to the ability to retain stored information within the memory circuitry after a read-out cycle, other features are present in the arrangements of applicant's previously referred to application. One of these features is a relatively high operating speed acquired by causing write-in operations to overlap read-out operations. Another of these features is the ability to immediately read out any of the stored information. That is, random access to the stored information is provided as distinguished from sequential access. Still another feature is that the matrices lend themselves to rapid construction.

An object of the present invention is to provide all of the above-described features in a bit-organized memory arrangement, that is, one in which information may be read out of and written into a single pair of devices at any one time, as distinguished from a word-organized arrangement.

In one of its broader aspects the present invention utilizes two identical matrices of memory devices where the condition of any one of the devices may be switched by the use of appropriate signals. Such matrices are well known and may, for example, be of the coincident current type, wherein currents applied to a pair of column and row leads cause the device at the intersection of these leads to change state. In accordance with the invention, corresponding devices in the matrices are utilized in a manner to form two-device cells with only one device in each cell storing information at any one time. Stored information is read out of a cell by applying read signals to both devices in the cell. These read signals leave both of the devices in a particular condition. When the read signals cause one of the devices to start to change its condition, an output pulse appears on a sensing lead which indicates, for the purposes of explanation, that one of the devices was previously storing a binary 1. The absence of an output pulse indicates that a binary 0 was previously stored. When restoring a binary 1, the output pulse causes write signals to be applied to the device whose condition was not changed during read-out, thereby placing this device in its binary 1 state. When a binary 0 is restored, write signals are not applied. Furthermore, when the read-out information is to be replaced by new information the write signals are either applied or withheld in accordance with the information to be stored. Because an output pulse generally occurs before a device completely changes state, the read-out and write-in operations are caused to overlap one another, thus providing a higher operating speed than would exist in the absence of this overlapping feature.

In one embodiment of the invention each of the matrices comprises rows and columns of magnetic cores with a sensing lead threading all of the cores and switching leads respectively threading the rows and columns of cores. A pair of address circuits having a common address initiator are connected to respective ones of the matrices so that the row and column leads of corresponding cores in the matrices are made available for read and write signals. The read signals are provided by a pair of positive drive sources connected respectively to the address circuits while the write signals are provided by a pair of negative drive sources connected respectively to the address circuits. The positive drive sources are caused to simultaneously produce read signals in response to a read-out initiator signal. Each of the negative drive sources normally produces a write signal when an output pulse (representative of a binary 1) is produced by the matrix connected to the other negative drive source. The signal causing a negative drive source to produce a write signal is also applied to an inhibit input terminal on the positive drive source whose output is applied to the same matrix. By this arrangement restoring of a binary 1 is accomplished by disabling the positive drive source appreciably before it completes the normal read-out cycle and enabling the negative drive source associated with the matrix containing the nonstoring core of the cell being interrogated. A binary 0 is restored as a result of an output pulse not being produced during readout (as neither of the interrogated cores changes state), thereby permitting the states of the interrogated cores to remain unchanged.

New information may also be stored in the above-described embodiment. When it is desired to store a binary 0, a signal is applied to an inhibit terminal on each of the negative drive sources, thereby preventing these sources from applying write signals to the matrices when a previously stored binary 1 is read out. Storing a binary 1 is accomplished through the use of a normally enabled gate circuit. The output of the gate circuit is connected to both the inhibit input terminal of one of the positive drive sources and the enabling input terminal of the negative drive source connected to the same matrix. The output signals from the matrices are applied to an inhibit terminal on the gate circuit. When a write 1 signal is applied to the input of the gate circuit and a previously stored binary 0 is read out of the matrices, the gate circuit passes the write 1 signal and a binary 1 is written into one of the matrices. When a previously stored binary 1 is read out of one of the matrices, the write 1 signal is blocked by the gate circuit and the output pulse is used to write in a binary 1.

Various devices, such as magnetic cores and magnetic wires, may be used in practicing the invention. The magnetic wires may take the form of the so-called twisters disclosed, for example, in both U.S. application, Serial No. 675,522, filed on August 1, 1957, by A. H. Bobeck, now U.S. Patent No. 3,083,353, and an article entitled "A New Storage Element Suitable for Large-Sized Memory Arrays—the Twister," by A. H. Bobeck, pages 1319–1340 of the November 1957 issue of the Bell System Technical Journal.

Other objects and features of the present invention will become apparent from a study of the following detailed description of a specific embodiment.

Figure 1:
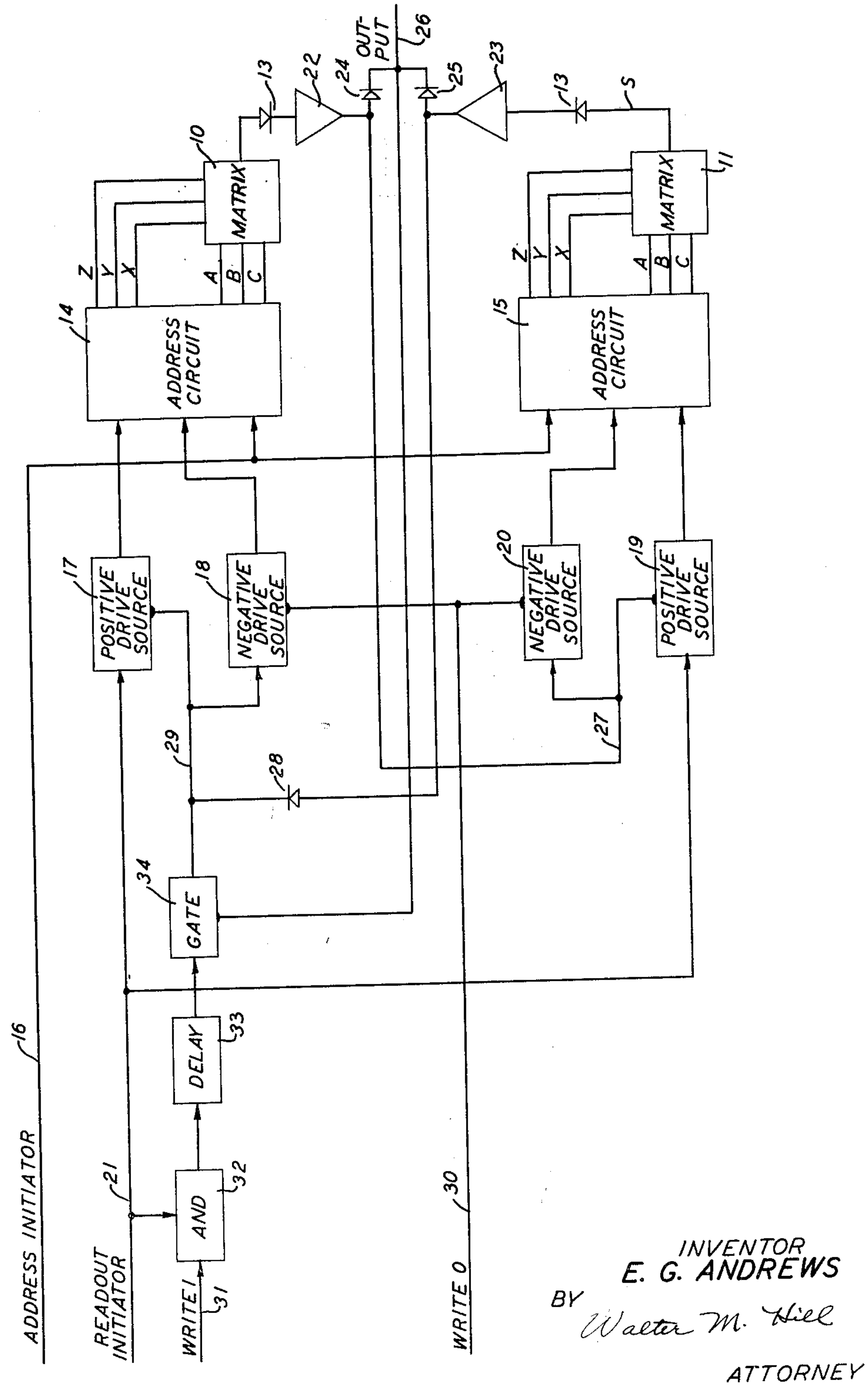
FIG. 1 is a block diagram of a storage circuit illustrating the principles underlying the invention.
Figure 2:
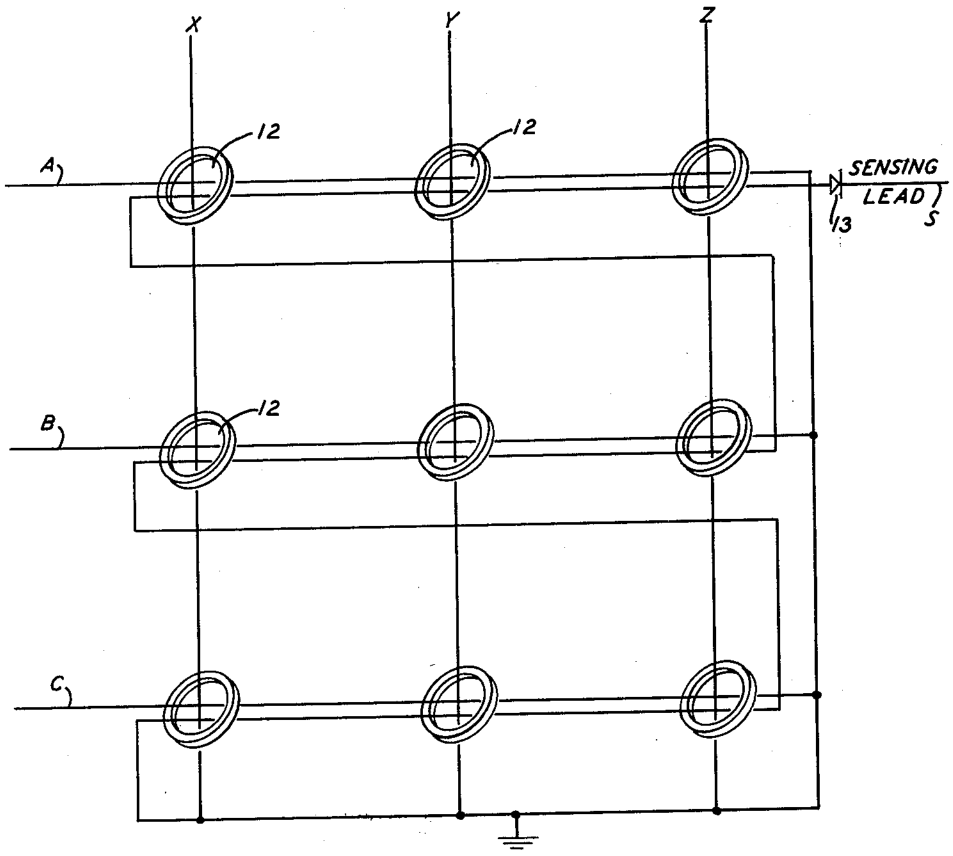
FIG. 2 is a schematic diagram of a magnetic core matrix which may be used in practicing the invention.

The arrangement in FIG. 1 includes a pair of matrices 10 and 11, each of which may take the form of the matrix illustrated in FIG. 2. The matrix of FIG. 2 includes a plurality of cores 12 arranged in columns and rows. The exact number of cores that should be included in a matrix of this type is, of course, determined by the quantity of information to be stored at any one time. For purposes of illustration the matrix has been limited to three rows and three columns of cores. The rows of cores are threaded respectively by leads A, B and C while the columns of cores are threaded respectively by leads X, Y and Z. One termination of each of these leads is returned to ground. The magnetic condition of a core is changed in the conventional manner by passing appropriate currents through its row and column leads. A sensing lead S is threaded through all of the cores with one termination thereof also returned to ground. Sensing lead S includes a diode 13 so that only positive output pulses are passed.

Referring again to FIG. 1, row leads A, B and C and column leads X, Y and Z of each of the matrices are connected to address circuits 14 and 15, respectively. Address circuits 14 and 15 have a common address initiator 16 which makes available corresponding row and column leads in matrices 10 and 11. A positive drive source 17 and a negative drive source 18 have their outputs connected to address circuit 14 while a positive drive source 19 and a negative drive source 20 have their outputs connected to address circuit 15. A read-out initiator lead 21 is connected to enabling inputs of positive drive sources 17 and 19. Signals applied to read-out initiator lead 21 cause positive drive sources 17 and 19 to produce positive polarity currents which are applied by address circuits 14 and 15, respectively, to corresponding row and column leads in matrices 10 and 11. Sensing lead S from matrix 10 is connected to an amplifier 22 while sensing lead S of matrix 11 is connected to an amplifier 23. The outputs from amplifiers 22 and 23 are applied via diodes 24 and 25 to an output lead 26. The output from amplifier 22 is also applied by way of a lead 27 to both an inhibit input terminal of positive drive source 19 and an enabling input terminal of negative drive source 20. The output from amplifier 23 is similarly applied by way of a diode 28 and a lead 29 to both an inhibit input terminal of positive drive source 17 and an enabling input terminal of negative drive source 18. Diodes 13, 24, 25 and 28 are all poled for positive-going pulses. By this arrangement when an output pulse is produced by one of the matrices 10, 11 as a result of a signal applied to read-out initiator lead 21, the positive drive source and the negative drive source associated with the other matrix are inhibited and enabled respectively, thereby changing the condition of the interrogated device in the latter matrix.

The portion of the embodiment of FIG. 1 thus far described permits stored information to be read out and restored. In particular, when an address circuit makes available a device in which a binary 1 is stored and a signal is applied to read-out initiator lead 21, an output pulse is produced by the matrix storing the binary 1. This output pulse, in addition to being available on output lead 26, causes the positive drive source and the negative drive source associated with the other matrix to be inhibited and enabled, respectively. This latter action causes the condition of the nonstoring device in the pair being interrogated to be placed in its binary 1 condition, thus restoring the binary 1. When a binary 0 is stored in a pair of devices, neither device is switched during interrogation and a pulse is not produced, which indicates at output lead 26 that a binary 0 was previously stored. In the absence of an output pulse, neither of the positive drive sources is inhibited nor is a negative drive source enabled, thus the condition of the interrogated devices are not changed, and a binary 0 is in effect restored.

A write 0 lead 30 is connected to an inhibit terminal on each of the negative drive sources 18 and 20. When a signal is applied to write 0 lead 30, negative drive sources 18 and 20 are prevented from producing a writing pulse. In accordance with this feature of the invention, a binary 0 is stored even though a previously stored binary 1 is read out.

A write 1 lead 31 is connected to one input of an AND gate 32. The other input of AND gate 32 is connected to read-out initiator lead 21. AND gate 32, therefore, passes write 1 signals only when a read-out signal is applied to read-out initiator lead 21. The output of AND gate 32 is applied to a delay circuit 33 which delays the write 1 signals passed by AND gate 32 for an interval at least equal to the time necessary to produce an output pulse when a binary 1 is stored in one of the matrices 10, 11. The output of delay circuit 33 is applied to a normally enabled gate circuit 34 which in turn has its output connected to lead 29. An inhibit terminal on gate circuit 34 is connected to output lead 26. In accordance with this feature of the invention, a binary 1 is stored by utilizing the write 1 signal when a binary 0 is read out and by utilizing the output pulse when a binary 1 is read out.

Figure 3:
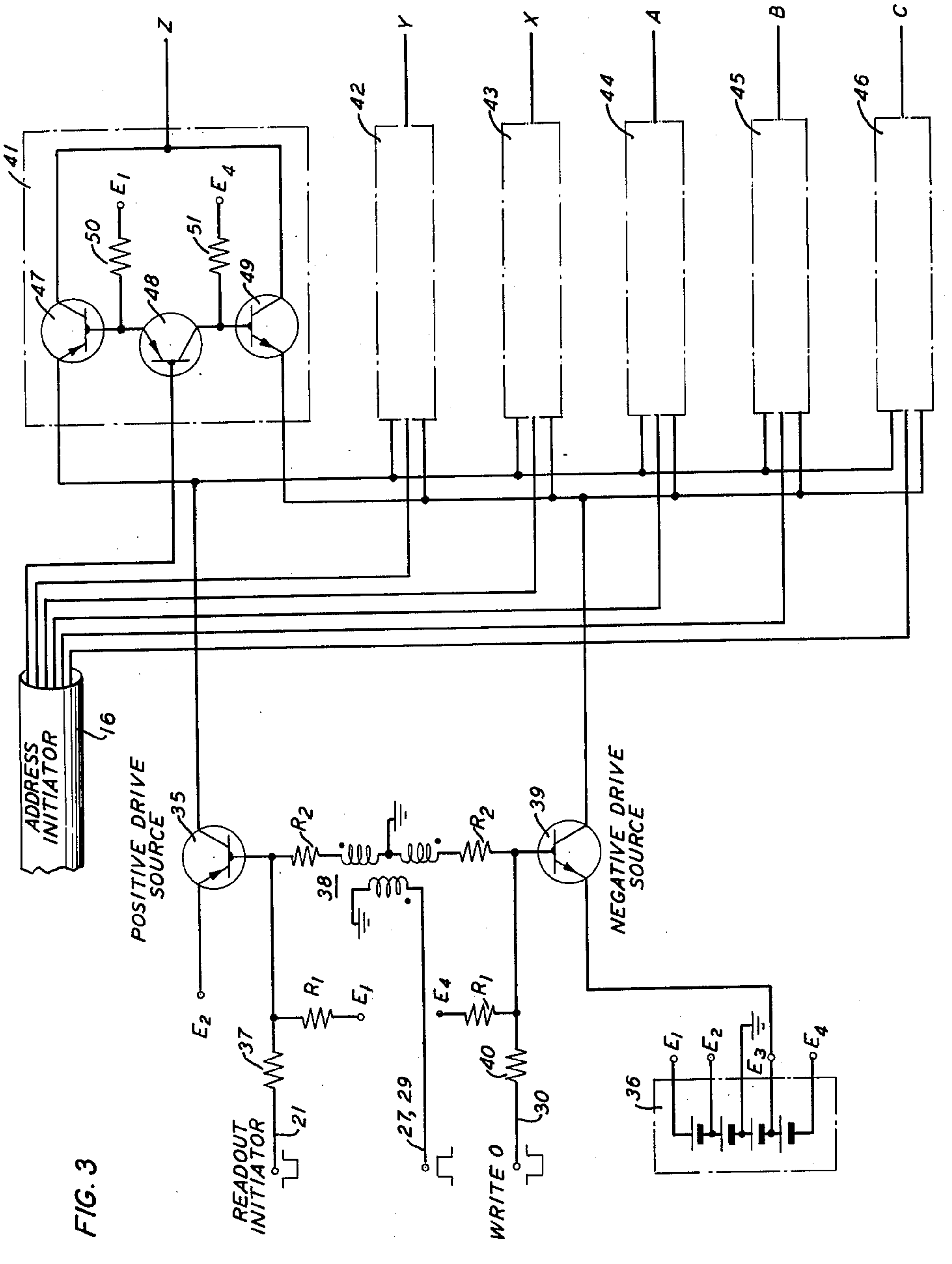
FIG. 3 is a schematic diagram of an address circuit, a positive drive source and a negative drive source that may be used in practicing the invention.

FIG. 3 is a schematic diagram of a positive drive source, a negative drive source and an address circuit that may be used in practicing the invention. The positive drive source includes a PNP transistor 35 whose emitter is clamped to a positive potential E2 from a potential source 36. The base of transistor 35 is connected by way of a resistor 37 to read-out initiator lead 21 and by way of a second resistor R1 to a positive potential E1 from source 36. The base of transistor 35 is also connected to ground by way of a series combination comprising a secondary winding of a transformer 38 and a resistor R2. The primary winding of transformer 38 is connected between ground and one of the leads 27, 29. The values of the components and potentials are selected so that $$|E2| < \left(\frac{R2}{R1+R2}\right)|E1|$$

thereby maintaining transistor 35 in its Off state in the absence of signals applied to read-out initiator lead 21 and lead 27, 29. The signal applied to read-out initiator lead 21 is negative-going (as illustrated) so that the potential of the base of transistor 35 is caused to drop below potential E2, thereby turning on the transistor. Transformer 38 is poled (as illustrated) so that a positive-going signal applied to lead 27, 29 causes a positive-going signal to be applied to the base of transistor 35. This positive-going signal is of sufficient amplitude to cause transistor 35 to turn off even though an input signal is applied to read-out initiator lead 21. The absence or presence of a potential across this secondary of transformer 38, as a result of a signal on lead 27, 29, therefore determines whether or not transistor 35 is in its On state as a result of a signal on lead 21.

The negative drive source is similar to the positive drive source. The emitter of an NPN transistor 39 is clamped to a negative potential E3 from source 36. The base of this transistor is connected to write 0 lead 30 by way of a resistor 40 and to a negative potential E4 by a second resistor R1. The base of transistor 39 is also connected to ground by way of a series combination comprising another secondary winding of transformer 38 and a second resistor R2. The values of the components and potentials are selected so that $$|E3| < \left(\frac{R2}{R1+R2}\right)|E4|$$

thereby maintaining transistor 39 in its Off state in the absence of signals applied to write 0 lead 30 and lead 27, 29. The secondary winding connected in the base circuit of transistor 39 is poled with respect to the primary winding of transformer 38 so that a positive-going signal applied to lead 27, 29 causes a positive-going signal to be applied to the base. This positive-going signal is of sufficient amplitude to cause transistor 39 to turn on long enough to switch the cores. Negative-going signals (as illustrated) are applied to write 0 lead 30. These negative-going signals are of sufficient amplitude to prevent transistor 39 from turning on when a positive signal is applied by lead 27, 29.

The address circuit of FIG. 3 comprises a plurality of switching circuits 41 through 46, each of which is identical to the circuit arrangement illustrated in switching circuit 41. Switching circuit 41 includes a pair of PNP transistors 47 and 48 and an NPN transistor 49. The emitters of transistors 47 and 49 are respectively connected to the collectors of transistors 35 and 39 while their collectors are each connected to switching lead Z of one of the matrices. The emitter and the collector of transistor 48 are connected respectively to the bases of transistors 47 and 49. A resistor 50 is connected between the base of transistor 47 and potential E1 of source 36 while a resistor 51 is connected between the base of transistor 49 and potential E4 of source 36. The base of transistor 48 is connected to one of the leads from address initiator 16. When the potential applied to the base of transistor 48 is sufficient to maintain this transistor in its Off state, the potentials on the bases of transistors 47 and 49 are E1 and E4, respectively. These potentials are sufficient in magnitude to maintain transistors 47 and 49 in their Off states even though transistors 35 and 39 are turned on. When, however, the potential applied to the base of transistor 48 by address initiator 16 is sufficient to turn it on, potential drops appear across resistors 50 and 51 so that the bases of transistors 47 and 49 are substantially at ground potential. Under the latter condition, transistors 47 and 49 turn on when transistors 35 and 39, respectively, are turned on. In order to pass positive or negative currents through switching lead Z, it is, therefore, necessary to turn on transistor 48, which in turn places potentials on the bases of transistors 47 and 49 so that they turn on when the transistors connected to their respective emitters are turned on.

As discussed previously, the present invention is easily practiced through the use of magnetic storage devices, but it may also be practiced through the use of other types of bit-organized matrices. Furthermore, although the invention has been described with respect to a specific embodiment, it will be evident to those skilled in the art that various modifications may be made without departing from the spirit and scope of the invention.

What is claimed is:

1. In combination first and second identical groups of two-state devices, a pair of sensing means associated respectively with said groups to produce output pulses when said devices are switched from a first of said states to a second of said states, first means responsive to an input signal for switching a preselected one of said devices in said first group to said second state when in said first state, second means responsive to said input signal for switching the device in said second group that corresponds to said preselected device to said second state when in said first state, third means responsive to said output pulses produced by said first and second groups sensing means for disabling said second and first means, respectively, fourth means responsive to said output pulses produced by said second group sensing means for switching said preselected device from said second state to said first state, and fifth means responsive to said output pulses produced by said first group sensing means for switching said corresponding device from said second state to said first state.

2. Apparatus in accordance with claim 1 wherein said two-state devices comprise magnetic cores having high remanence characteristics.

3. Apparatus in accordance with claim 1 wherein said apparatus includes means responsive to a second input signal for disabling said fourth and fifth means, means responsive to a third input signal for both disabling said fifth means and causing said fourth means to switch said preselected device from said second state to said first state only when said pulses are not produced.

4. Apparatus in accordance with claim 3 wherein said two-state devices comprise magnetic cores having high remanence characteristics.

5. In combination first and second identical bit-organized matrices each comprising a plurality of two-state devices and a sensing lead to produce an output pulse when any one of said devices is switched from a first of said states to a second of said states, first means responsive to an input signal for switching a preselected one of said devices in said first matrix to said second state when in said first state, second means responsive to said input signal for switching the device in said second matrix that corresponds to said preselected device to said second state when in said first state, third means responsive to said output pulses appearing on said first and second matrix sensing leads for disabling said second and first means, respectively, fourth means responsive to said output pulses on said second matrix sensing lead for switching said preselected device from said second state to said first state, and fifth means responsive to said output pulses on said first matrix sensing lead for switching said corresponding device from said second state to said first state.

6. Apparatus in accordance with claim 5 wherein said two-state devices comprise magnetic cores having high remanence characteristics.

7. Apparatus in accordance with claim 5 wherein said apparatus includes means responsive to a second input signal for disabling said fourth and fifth means and means responsive to a third signal for both disabling said first means and causing said fourth means to switch said preselected device from said second state to said first state only when said pulses are not produced.

8. Apparatus in accordance with claim 7 wherein said two-state devices comprise magnetic cores having high remanence characteristics.

9. Apparatus in accordance with claim 7 wherein said two-state devices comprise magnetic wires having high remanence characteristics.

10. A memory circuit comprising a first group of two-state devices, a second group of two-state devices identical to said first group of devices, first and second controllable means each of which is to produce first and second signals, first switching means to cause a selected device in said first group to switch from a first state to a second state in response to said first controllable means first signal and to switch from said second state to said first state in response to said first controllable means second signal, second switching means to cause a device in said second group corresponding to said selected device to switch from said first state to said second state in response to said second controllable means first signal and to switch from said second state to said first state in response to said second controllable means second signal, means for applying a first input signal to said first and second controllable means to cause said first and second controllable means to produce substantially simultaneously said first signals, first and second sensing means for producing pulses in response to the switching of said devices in said first and second groups, respectively, from said first state to said second state, first means responsive to said pulses produced by said first sensing means to prohibit said second controllable means from producing said first signal while causing said second controllable means to produce said second signal, and second means responsive to said pulses produced by said second sensing means to prohibit said first controllable means from producing said first signal while causing said first controllable means to produce said second signal.

11. Apparatus in accordance with claim 10 wherein said two-state devices comprise magnetic cores having high remanence characteristics.

12. Apparatus in accordance with claim 10 including means responsive to a second input signal for prohibiting said first and second controllable means from producing said second signals and means responsive to a third input signal for applying an input signal to said second means only when said pulses do not appear on said first and second sensing means.

13. Apparatus in accordance with claim 12 wherein said two-state devices comprise magnetic cores having high remanence characteristics.

14. A memory circuit comprising first and second identical bit-organized matrices each comprising a plurality of two-state devices and a sensing lead to produce an output pulse when any one of said devices is switched from a first of said states to a second of said states, first and second controllable means each of which is controllable to produce first and second signals, first switching means to cause a selected device in said first matrix to switch from said first state to said second state in response to said first controllable means first signal and to switch from said second state to said first state in response to said first controllable means second signal, second switching means to cause a device in said second matrix corresponding to said selected device to switch from said first state to said second state in response to said second controllable means first signal and to switch from said second state to said first state in response to said second controllable means second signal, means for applying a first input signal to said first and second controllable means to cause said first and second controllable means to produce substantially simultaneously said first signal, first means responsive to said pulses on said first matrix sensing lead to prohibit said second controllable means from producing said first signal while causing said second controllable means to produce said second signal, and second means responsive to said pulses on said second matrix sensing lead to prohibit said first controllable means from producing said first signal while causing said first controllable means to produce said second signal.

15. Apparatus in accordance with claim 14 wherein said two-state devices comprise magnetic cores having high remanence characteristics.

16. Apparatus in accordance with claim 14 including means responsive to a second input signal for prohibiting said first and second controllable means from producing said second signals and means responsive to a third input signal for applying an input signal to said second means only when said pulses do not appear on said first and second matrix sensing leads.

17. Apparatus in accordance with claim 16 wherein said two-state devices comprise magnetic cores having high remanence characteristics.

18. Apparatus in accordance with claim 16 wherein said two-state devices comprise magnetic wires having high remanence characteristics.

19. A memory circuit comprising a first group of two-state devices, a second group of two-state devices identical to said first group of devices, each of said devices switching from a first of said states to a second of said states in response to a first polarity signal and from said second state to said first state in response to a second polarity signal, first and second sensing means for producing output pulses in response to the switching of said devices in said first and second groups, respectively, from said first state to said second state, first and second means each producing said first polarity signals in response to signals applied to a first input terminal and each disabled in response to signals applied to a second input terminal, third and fourth means each producing said second polarity signals in response to signals applied to a first input terminal and each disabled in response to signals applied to a second input terminal, means for applying a first input signal to said first input terminals of said first and second means, means responsive to said second sensing means output pulses for applying signals to said second input terminal of said first means and said first input terminal of said third means, means responsive to said first sensing means output pulses for applying signals to said second input terminal of said second means and said first input terminal of said fourth means, normally enabled gating means for transmitting second input signals to said second input terminal of said first means and said first input terminal of said third means, said gating means having a disabling input terminal, means for applying signals to said disabling input terminal in response to said output pulses, means for applying a third input signal to said second input terminals on said third and fourth means, and switching means for applying said first and second polarity signals from said first and third means to a preselected device in said first group of devices and said first and second polarity signals from said second and fourth means to the device in said second group corresponding to said preselected device.

20. In combination first and second identical bit-organized matrices each comprising a plurality of two-state devices and a sensing lead to produce an output pulse when any one of said devices is switched from a first of said states to a second of said states, normally enabled gating means for transmitting first input signals, first means for applying said output pulses to said normally enabled gating means to disable said gating means, second means responsive to a second input signal for switching a preselected one of said devices in said first matrix to said second state when in said first state, third means for applying said output pulses appearing on said second matrix sensing lead to said second means to disable said second means, fourth means for applying said first input signals transmitted by said gating means to said second means to disable said second means, fifth means responsive to said second input signal for switching the device in said second matrix that corresponds to said preselected device to said second state when in said first state, sixth means for applying said output pulses appearing on said first matrix sensing lead to said fifth means to disable said fifth means, seventh means responsive to said output pulses on said second matrix sensing lead for switching said preselected device from said second state to said first state, eighth means for applying said first input signals transmitted by said gating means to said seventh means for switching said predetermined device from said second state to said first state, ninth means responsive to said output pulses on said first matrix sensing lead for switching said corresponding device from said second state to said first state, and tenth means for applying third input signals to said seventh and ninth means to disable said seventh and ninth means.

References Cited in the file of this patent

UNITED STATES PATENTS

| | | |
|---|---|---|
| 2,798,216 | Goldberg et al. | July 7, 1957 |
| 2,802,203 | Stuart-Williams | Aug. 6, 1957 |
| 2,907,003 | Hobbs | Sept. 29, 1959 |